United States Patent
Sheehy et al.

(10) Patent No.: US 9,216,630 B2
(45) Date of Patent: Dec. 22, 2015

(54) WATER SHIELD

(71) Applicant: Toyota Motor Engineering & Manufacturing North America, Inc., Erlanger, KY (US)

(72) Inventors: Chris P. Sheehy, Ypsilanti, MI (US); Scott B. Smith, Milan, MI (US); Paxton S. Williams, Milan, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/803,822

(22) Filed: Mar. 14, 2013

(65) Prior Publication Data
US 2014/0259952 A1    Sep. 18, 2014

(51) Int. Cl.
*B60J 5/04*    (2006.01)

(52) U.S. Cl.
CPC ..................... *B60J 5/0418* (2013.01)

(58) Field of Classification Search
USPC ............... 49/502; 296/146.7, 146.1
IPC .............. B60J 5/0418, 5/0413, 5/0416
See application file for complete search history.

(56) References Cited

U.S. PATENT DOCUMENTS

| | | | |
|---|---|---|---|
| 3,636,676 A * | 1/1972 | Moss ...................... | 52/745.08 |
| 5,001,865 A * | 3/1991 | Procton .................... | 49/469 |
| 6,422,640 B2 | 7/2002 | Whitehead et al. | |
| 6,676,195 B1 | 1/2004 | Marriott et al. | |
| 6,712,179 B2 * | 3/2004 | Bouyonnet ................. | 181/290 |
| 6,767,049 B1 | 7/2004 | Morrison et al. | |
| 6,890,018 B1 * | 5/2005 | Koa et al. ................... | 296/146.5 |
| 7,032,955 B2 * | 4/2006 | Radu et al. ................ | 296/146.7 |
| 7,036,868 B2 | 5/2006 | Kohara et al. | |
| 7,402,537 B1 | 7/2008 | Lenda et al. | |
| 7,775,581 B2 * | 8/2010 | Kita et al. ................... | 296/146.7 |
| 7,913,807 B2 | 3/2011 | Gomi | |
| 8,065,836 B2 | 11/2011 | Koellner et al. | |
| 2002/0170235 A1 * | 11/2002 | Petroski et al. ............. | 49/502 |
| 2005/0052051 A1 * | 3/2005 | Kohara et al. .............. | 296/146.7 |
| 2005/0184555 A1 | 8/2005 | Williams et al. | |
| 2006/0261635 A1 | 11/2006 | Winborn et al. | |
| 2007/0046064 A1 * | 3/2007 | Winborn .................... | 296/146.7 |
| 2009/0134658 A1 | 5/2009 | Hanna | |
| 2009/0191379 A1 | 7/2009 | Filipczak et al. | |
| 2009/0322118 A1 | 12/2009 | Koa | |
| 2010/0018798 A1 * | 1/2010 | Jeon et al. .................... | 181/225 |
| 2012/0231215 A1 | 9/2012 | Hayashi | |

FOREIGN PATENT DOCUMENTS

WO    2010/070270 A1    6/2010

* cited by examiner

Primary Examiner — Gregory Strimbu
(74) Attorney, Agent, or Firm — Dinsmore & Shohl LLP

(57) ABSTRACT

A water shield for a door of a vehicle. The water shield includes a sheet of a water impervious material configured to be attached to an inboard panel of the door and extend over an access opening in the inboard panel. A cover of expanded foam is directly attached to the sheet to fit over the access opening in the door. A perimeter portion of the cover circumscribes the access opening. The cover is secured, around the access opening, to the inboard panel, resulting in sealing of the access opening and mass dampening of the inboard panel.

11 Claims, 3 Drawing Sheets

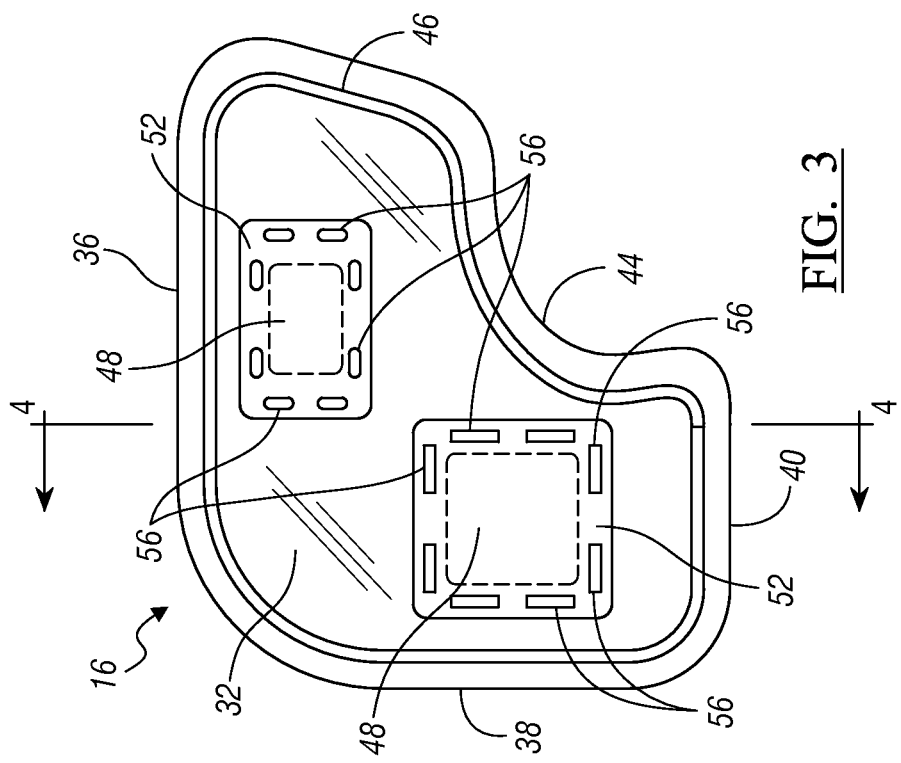
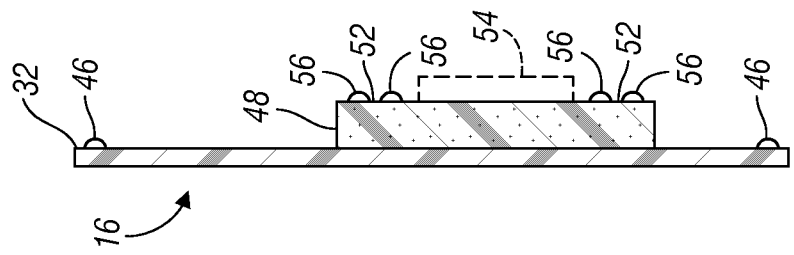
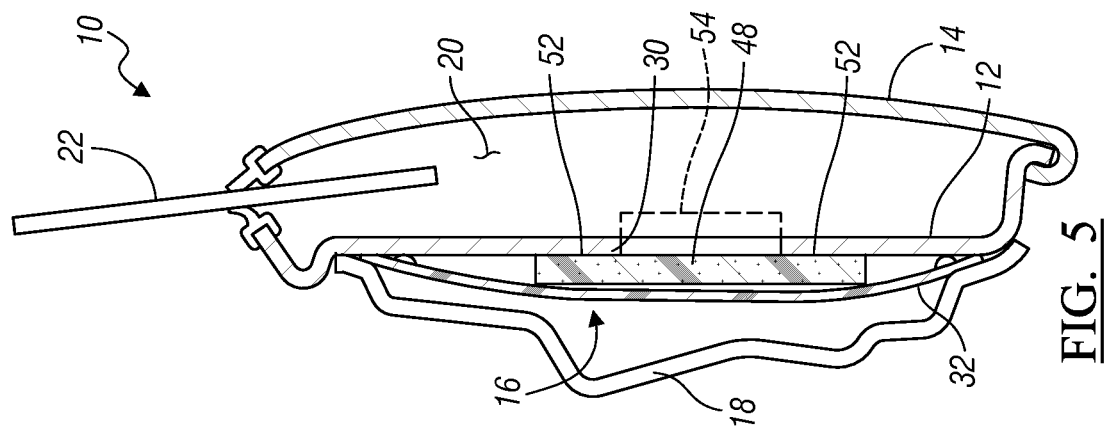

WATER SHIELD

BACKGROUND

1. Field of the Invention

The present invention generally relates to a water shield. More particularly, the invention relates to a vehicle door water shield that prevents water, dirt and sound from entering into the passenger compartment of the vehicle.

2. Description of Related Art

Vehicle doors generally include multiple panels that are connected together. Between these panels, an internal space is defined where a window may be retracted when opened and where wire harnesses and other components might be housed. As such, an inboard panel of the door typically includes one or more openings providing access to the internal space for installation or servicing purposes.

Since the space between the inboard and outboard panels of the door typically accepts a retracted window and because of other possible points of ingress in the outboard panel (e.g. handle openings and key lock openings), this space is susceptible to the encroachment of water, dirt, etc. therein. If left unchecked, such materials in the internal space can intrude upon the passenger compartment of the vehicle through the access opening. To prevent this encroachment, vehicle doors are provided with water shields.

A vehicle door's water shield is attached to the inward facing surface of the inboard panel and extends over the access opening. The attachment of the water shield is such that a seal is formed around the access opening. To provide the occupants with an aesthetically pleasing interior, a trim panel is mounted over the water shield on the interior of the vehicle's inboard panel.

When provided in a vehicle door, the water shield not only limits the intrusion of water, dirt and other debris into the passenger compartment, but it also limits the introduction of noise in the passenger compartment. Exterior vehicle noise, such as road noise, wind noise, and noise caused by vibration of the door itself, will eventually enter the occupant compartment of the vehicle through unobstructed access openings. Water shields typically attenuate noise being introduced into the vehicle by reflecting the sound back into internal space of the door.

While water shields may be formed of stamped sheet metal, injection molded rigid plastic, resilient foamed and non-foamed plastics, in their simplest form, water shields are flat or formed sheets of semi-rigid, water impermeable polymeric material extended over the inboard panel of the door and secured thereto by a bead of adhesive material. Being sealed around the access opening(s) by the bead of adhesive, the water shield limits the entry of water and dirt into the passenger compartment and also reflects sound back into the door, thereby attenuating the sound. Some of the noise, however, still manages to enter the passenger compartment. To further attenuate noise, acoustic materials, such as sound absorbing, non-woven fiber pads, are sometimes generally provided so as to be located between the sheet and the trim panel or between the sheet and inboard panel.

Even with these measures, vibration of the inboard panel or water shield can result in unwanted noise within the occupant compartment of the vehicle.

SUMMARY

According to one aspect of the invention, a door for a vehicle is provided with an outboard panel and inboard panel. The inboard panel has portions defining an access opening permitting access into a space formed between the inboard panel and the outboard panel. A water shield is secured to the inboard panel and extends over the access opening. The water shield further includes a sheet of a water impervious material attached to the inboard panel, with the sheet having a first sheet surface facing toward the inboard panel. A cover is located between the sheet and the inboard panel such that the cover extends completely over the access opening in the inboard panel. The cover defines a first cover surface and a second cover surface on opposing sides of the cover, and the cover is directly attached to the sheet and supported by the sheet. The second cover surface includes a perimeter portion that circumscribes the cover. The cover is provided in a location on the sheet whereby the cover is positioned over the access opening, and the perimeter portion circumscribes the access opening, upon attaching of the sheet to the inboard panel. The cover is also secured directly to the inboard panel in the perimeter portion whereby sealing of the access opening and mass dampening of the inboard panel is effectuated by the cover.

In another aspect, the cover is permanently attached to the sheet by heat stakes.

In a further aspect, the cover is attached to the inboard panel by adhesive.

In an additional aspect, the cover is attached to the inboard panel by a series of adhesive spots positioned in spaced apart locations along the perimeter portion of the cover.

In still another aspect, the cover does not extend through the access opening.

In yet a further aspect, a portion of the cover extends through the access opening.

In an additional aspect, the sheet is a semi-rigid, flexible material.

In a yet another aspect, the sheet is LDPE.

In still a further aspect, the cover is expanded foam.

In an additional aspect, the cover is polypropylene.

According to another aspect of the invention, a water shield for a door of a vehicle, the door including spaced apart outboard and inboard panels defining a space therebetween and the inboard panel having portions defining at least one access opening permitting access into the space, is provided. The water shield includes a sheet of a water impervious material configured to extend over a portion of the inboard panel to be attached thereto; a cover of expanded foam directly attached to the sheet, the cover including a perimeter portion circumscribing the cover, the cover being positioned in a location on the sheet whereby the cover is configured to extend over the access opening with the perimeter portion circumscribing the access opening, the cover including a securement on the perimeter portion, the securement configured to attach the cover around the access opening to the inboard panel when the sheet is attached to the inboard panel, whereby mass dampening of the inboard panel is effectuated by the cover.

In another aspect, the securement is adhesive.

In a further aspect, the securement is adhesive positioned in spaced apart locations along the perimeter portion.

In an additional aspect, the cover has a first mass and the sheet has a second mass, the first mass being greater than the second mass.

In yet another aspect, the sheet is LDPE and the cover is expanded foam.

In still a further aspect, the cover is attached to the sheet by heat stakes.

In an additional aspect, the sheet is formed of a sound blocking material.

In still another aspect, the cover is formed of a sound blocking and sound absorbing material.

In an additional aspect, the sheet is formed of a sound blocking material and the cover is formed of sound blocking and mass dampening material.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 3 is a plan view of the water shield seen in FIGS. 1 and 2 when viewed from the outboard side of the water shield;

FIG. 4 is a sectional view generally taken along line 4-4 in FIG. 3; and

FIG. 5 is a sectional view generally taken along line 5-5 in FIG. 2.

DETAILED DESCRIPTION

Figure 1:
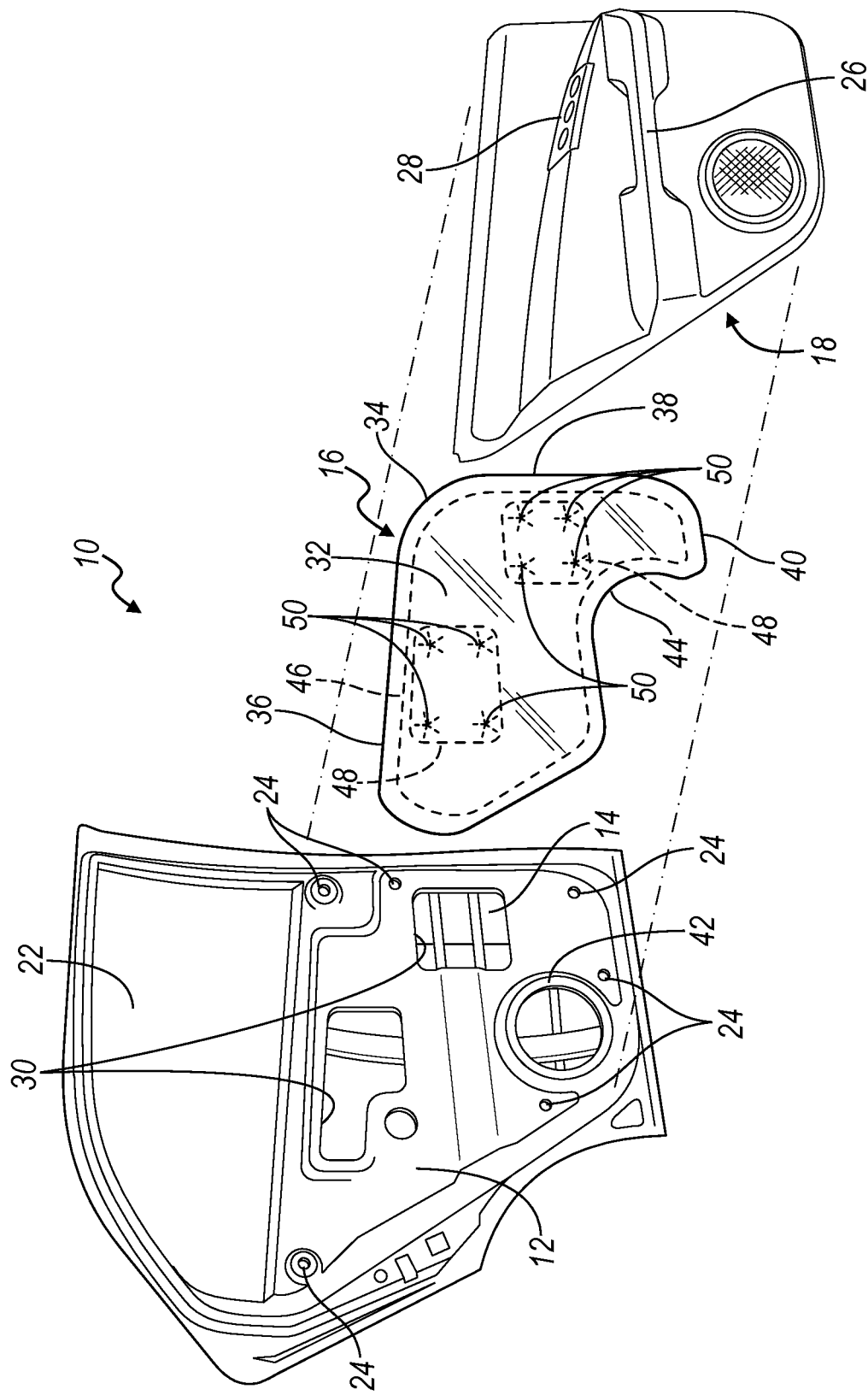
FIG. 1 is an exploded view of a vehicle door and water shield incorporating the principles of the present invention.

Directional identifiers used herein are intended to be interpreted with respect to an automotive vehicle. Accordingly, a direction stated as being forward would mean toward the front of the vehicle and a direction stated as being rearward would mean toward the rear of the vehicle. Inboard and outboard are relative terms and are to be referenced with respect to the longitudinal centerline, with the inboard element being closer to the longitudinal centerline than the outboard element. Inward/interior and outward/exterior facing are similarly referenced relative to the longitudinal centerline of the vehicle or the vehicle's cabin/occupant compartment.

Referring now in to the drawings, a vehicle door embodying the principles of the present invention is illustrated therein and designated at 10. As its primary components, the vehicle door 10 includes a plurality of body panels, the two main body panels being an inboard panel 12 and an outboard panel 14, as well as a water shield 16 and a trim panel 18.

The inboard panel 12 is attached to the outboard panel 14 and defines an internal space 20 therebetween. Best seen in FIG. 5, the space 20 is designed to house various components of the door 10, such as wires, connectors, audio system speakers, a retracted window 22, as well as the mechanisms regulating the movement of the window 22. In order to allow for access into the space 20 for installation and servicing of these various components, the inboard panel 12 may include one or more access openings 30. The inboard panel 12 is also used as a support for various components of the vehicle, including the previously mentioned audio system speakers and the trim panel 18. The outboard panel 14, as will be appreciated, forms an exterior surface of the vehicle.

The trim panel 18 is mounted to the interior facing surface of the inboard panel 12. To facilitate this mounting, fasteners of the Christmas-tree variety may be integrally provided on an outwardly facing surface of the trim panel 18 so as to extend through and engage apertures 24 provided in the inboard panel 12. Obviously, other mechanisms for mounting the trim panel 18 to the inboard panel 12 may be used.

The trim panel 18 forms the interior surface of the door 10 and, therefore, has an aesthetically pleasing configuration. In connection with its aesthetic requirements, the trim panel 18 also provides functionality to the door 10. For example, the trim panel 18 may include a grab handle 26 to facilitate closing of the door 10 from within the occupant compartment of the vehicle. Additionally, the trim panel 18 may include switches 28 that enable an occupant of the vehicle to lock/unlock the door 10, to open/close one or more windows 22 or to perform other functions.

Because of the window 22 and other openings in the outboard panel 14, water, dirt and other foreign debris (hereinafter just "water") can sometimes find their way into the space 20 between the inboard and outboard panels 12, 14. With the presence of an access opening 30, water may encroach upon and enter the cabin of the vehicle. To prevent this, the water shield 16 is positioned between the inboard panel 12 and the trim panel 18, over the access opening(s) 30.

Referring now to FIGS. 3-5, the water shield 16 will be described in greater detail. The water shield 16 includes several components, the first of which is a thin and semirigid flexible sheet 32. As such, the sheet 32 may be formed from a variety of materials, including polymeric materials such as low density polyethylene (LDPE). The sheet 32 has a perimeter 34 whose shape generally corresponds at least to a portion of the shape of the inboard panel's interior surface. The sheet 32 may therefore have a top edge 36, a front edge 38 and a bottom edge 40 that correspondingly follow the contour of a portion of the inboard panel 12. If desired, portions of the sheet 32 may be configured so as to extend around other features formed in the inboard panel 12. For example, it is possible that the inboard panel 12 may define a mounting structure 42 for an audio system speaker (not shown). The sheet 32, in this instance, may include a cut-out or recess 44 to accommodate the mounting structure 42.

Figure 2:
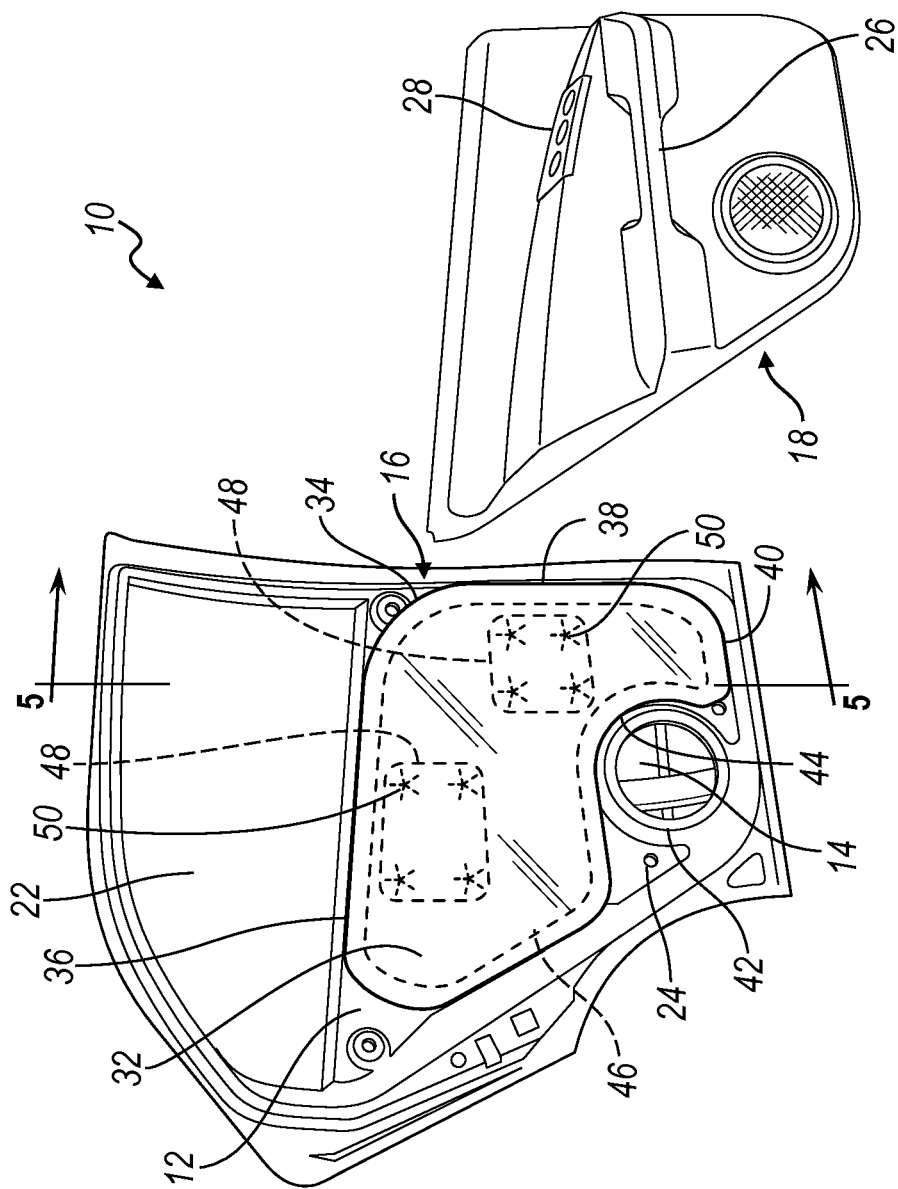
FIG. 2 is a view similar to FIG. 1, but with the water shield secured to the vehicle door.

When mounted to the interior surface of the inboard panel 12, the top edge 36 of the sheet 32 is positioned along an upper edge of the inboard panel's interior surface. The front edge 38 and bottom edge 40 are similarly positioned along the rearward and lower edges of the inboard panel 12. The cut-out 44, as seen in FIG. 2, extends around the mounting structure 42 for the audio system speaker.

The illustrated embodiment of the figures is but one implementation of the sheet 32. Accordingly, the perimeter 34 of the sheet 32 may vary from the illustration and may include a lesser number, or none, of the edges or portions that correspond with the shape of the inboard panel 12. However, the overall size or area of the sheet 32 is such that when attached to the inboard panel 12, the sheet 32 extends completely over the access opening 30.

To secure the sheet 32 to the inboard panel 12, a bead 46 of adhesive is applied to the sheet 32. The bead 46 may generally correspond to the shape of the perimeter 34 or may vary from that shape in one or more locations as dictated by the specific design of the water shield 16 and the inboard panel 12. Various adhesives may be employed to form the bead 46, and one preferred adhesive is butyl-based adhesive. While not illustrated in the figures, the inboard panel 12 may include a recess generally corresponding to a desired location for proper positioning of the bead 46 and, therefore, proper positioning of the sheet 32 and the water shield 16.

An access opening cover 48, or more than one cover 48, is positioned between the inboard panel 12 and the sheet 32. Two covers 48 corresponding to the two access openings 30 are shown in the figures. A greater or lesser number of covers 48 may be used, however, depending on the number of access openings 30 and the size of the covers 48. While the sheet 32, once attached to the inboard panel 12, will press the covers 48 into engagement with the inboard panel 12, the covers 48 are attached to and supported by the sheet 32. This aids in the handling and installation of the water shield 16. Since the general characteristics of the covers 48 are the same, the discussion which follows only speaks to the covers 48 in singular form, it being understood that this is in no way intended to limit the invention.

The cover 48 is constructed of a material that readily allows it to be directly and permanently secured to the sheet 32. Preferably, the cover 48 is secured to the sheet 32 by thermal welding and the formation of heat stakes 50. When the sheet 32 is constructed of LDPE, heat staking is possible by providing the cover 48 in an expanded foam form of polypropylene. As an alternative to heat staking, adhesives or other mechanisms may be employed.

The cover 48 is provided on the sheet 32 in a location enabling it to extend completely over an access opening 30. In this regard, the size and shape of a cover 48 is such that the cover 48 is larger than the associated access opening 30. Preferably, the cover 48 includes a planar and flat perimeter portion 52 that defines an enclosed area large enough such that the entire access opening 30 can be located therein. By providing the cover 48 with such a perimeter portion 52, it is possible for the sheet 32 to be slightly misaligned in its position on the inboard panel 12 while still allowing the cover 48 to completely extend over the access opening 30. This reduces the required tolerances for installation of the water shield 16. It further allows the cover 48 to be used in multiple vehicle platforms.

The cover 48 may be a planar body as seen in FIG. 4 or, alternatively, it may have a recess or a protruding portion in its center. For illustrative purposes, a protruding portion 54 is illustrated in phantom in FIG. 4. If a protruding portion 54 is provided, the protruding portion 54 may be provided in a shape closely corresponding to the shape of the access opening 30.

In addition to being attached to the sheet 32, the cover 48 is also attached to the interior surface of the inboard panel 12. This attachment is facilitated by a series of spot adhesive 56 (strips or dots) provided at spaced intervals about the perimeter portion 52 of the cover 48. Alternatively, the series of spot adhesive 56 may be replaced with a continuous bead/strip of adhesive.

The material of the cover 48 has various benefits beyond preventing water from passing through the access opening 30. Various benefits come from the material forming the cover 48. The expanded foam forming the cover 48 allows the cover 48 to aid in noise attenuation by both reflecting and absorbing mechanisms. An added benefit comes from the mass of the expanded foam. By securing the cover 48 to the inboard panel 12, the cover 48 effectuates mass dampening. As a result, the vibration of the inboard panel 12 itself, and its associated sound during closing of the door 10 or operation of the vehicle, is reduced. It has been noted that the mass dampening of the inboard panel 12 causes the door to resonate more deeply upon closing. The deeper sound resulting from the closing of the door 10 is attributable, in the mind of a consumer, with a high-quality vehicle.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

We claim:
1. A door for a vehicle, the door comprising:
an outboard panel and an inboard panel, the inboard panel having an access opening therein permitting access into a space formed between the inboard panel and the outboard panel;
an interior trim panel;
a water shield mounted to the inboard panel and extending over the access opening, the water shield further comprising,
a sheet of a water impervious material attached directly to and engaging the inboard panel, the sheet having a sheet surface facing toward the inboard panel, and
a cover located between the sheet and the inboard panel wherein a perimeter of the sheet circumscribes a perimeter of the cover, and the cover extends completely over the access opening in the inboard panel, the cover including a first cover surface and a second cover surface on opposing sides of the cover, the cover being directly attached to and engaging the sheet by the first cover surface and being supported by the sheet, the perimeter of the cover circumscribes the access opening upon attaching the sheet directly to the inboard panel, the cover further being secured directly to and engaging the inboard panel at the perimeter of the cover whereby mass damping of the inboard panel is effectuated by the cover.

2. The door of claim 1, wherein the cover is permanently attached to the sheet by heat stakes.

3. The door of claim 1, wherein the cover is secured to the inboard panel by adhesive.

4. The door of claim 1, wherein the cover does not extend through the access opening.

5. The door of claim 1, wherein a portion of the cover extends through the access opening.

6. The door of claim 1, wherein the sheet is a semi rigid, flexible material.

7. The door of claim 1, wherein the sheet is polyethylene.

8. The door of claim 1, wherein the cover is expanded foam.

9. The door of claim 1, wherein the cover is polypropylene.

10. The door of claim 1, wherein the cover is located on an interior side of the inboard panel and positioned between the interior side of the inboard panel and the sheet, the sheet being attached to the interior side of the inboard panel at locations spaced apart from the cover and located outboard of the cover.

11. The door of claim 1, wherein the cover corresponds in size and shape to the access opening in the inboard panel.

* * * * *